United States Patent [19]

Blok

[11] Patent Number: 4,949,503
[45] Date of Patent: Aug. 21, 1990

[54] POROUS PRODUCT FOR CULTIVATION PLANTS AND A METHOD FOR MANUFACTURING SAME

[75] Inventor: Christiaan Blok, Roermond, Netherlands

[73] Assignee: Rockwool Lapinus B.V., Melick-Herkenbosch, Netherlands

[21] Appl. No.: 438,934

[22] Filed: Nov. 16, 1989

Related U.S. Application Data

[63] Continuation of Ser. No. 145,480, Jan. 19, 1988, abandoned.

[30] Foreign Application Priority Data

Jan. 27, 1987 [NL] Netherlands ............... 8700199

[51] Int. Cl.$^5$ ............................................. A01G 31/02
[52] U.S. Cl. .............................................. 47/64; 47/9
[58] Field of Search ............... 47/77, 9, 56, 59, 62–64, 47/80; 428/288, 290

[56] References Cited

U.S. PATENT DOCUMENTS

| | | | |
|---|---|---|---|
| 2,243,857 | 6/1941 | Fischer | 47/9 |
| 3,511,694 | 5/1970 | Lippoldt et al. | 47/9 X |
| 4,067,140 | 1/1978 | Thomas | 47/9 |
| 4,219,600 | 8/1980 | Surowitz et al. | 47/9 X |
| 4,605,401 | 5/1984 | Chmelir et al. | 604/368 |

FOREIGN PATENT DOCUMENTS

| | | | |
|---|---|---|---|
| 0038234 | 3/1981 | European Pat. Off. | |
| 3121277 | 5/1981 | Fed. Rep. of Germany | |
| 7117588 | 6/1972 | Netherlands | 47/59 |
| 381008 | 10/1964 | Switzerland | 47/1.2 |
| 0988241 | 1/1983 | U.S.S.R. | 47/62 |
| 1161021 | 6/1985 | U.S.S.R. | 47/59 |
| 1161022 | 6/1985 | U.S.S.R. | 47/64 |
| 1418 | 4/1985 | World Int. Prop. O. | 47/25 |

OTHER PUBLICATIONS

*This is Rockwool*, Supplement to the Grower, pp. 19–40, 11/1979.
*Layered Lettuce Slope*, The Grower, 4/1981.

Primary Examiner—Robert A. Hafer
Assistant Examiner—Kevin G. Rooney
Attorney, Agent, or Firm—Webb, Burden, Ziesenheim & Webb

[57] ABSTRACT

The invention relates to a porous product for cultivating plants, comprising a matrix of mineral fibres which can be moistened with water, by material present in said porous product having a greater water retaining capacity than said mineral fibres which form said matrix and which can be moistened with water, of which preferably said material consists of flakes having a greater water retaining capacity and are accommodated therein over the whole height or only a portion of the height, and comprises mineral fibres that can be moistened with water, the density of which is at least 20, preferably 30, or more preferably 40 kg/m$^3$ greater than the density of the mineral fibre matrix, and further to a method for manufacturing such a porous product.

12 Claims, 3 Drawing Sheets

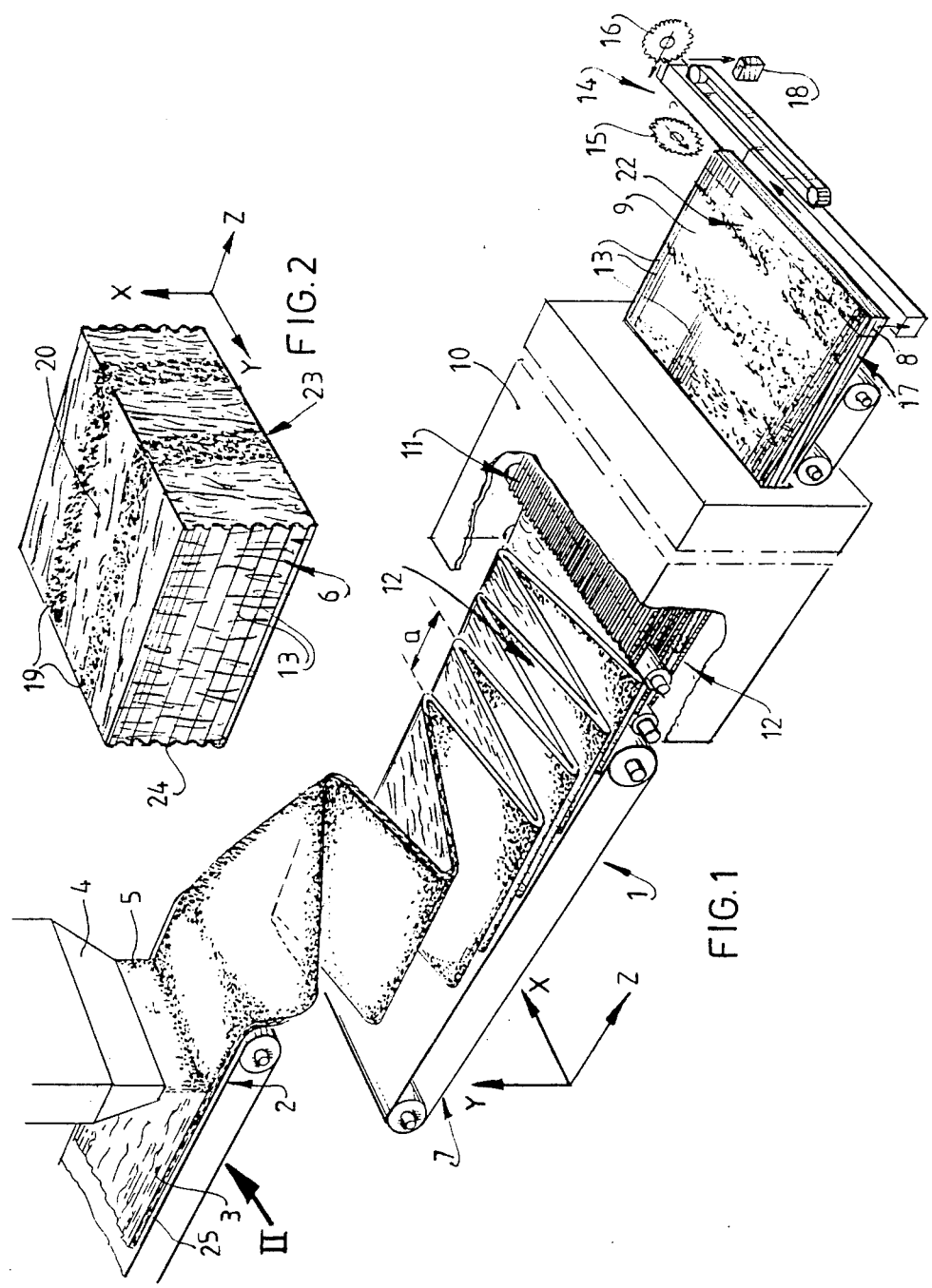

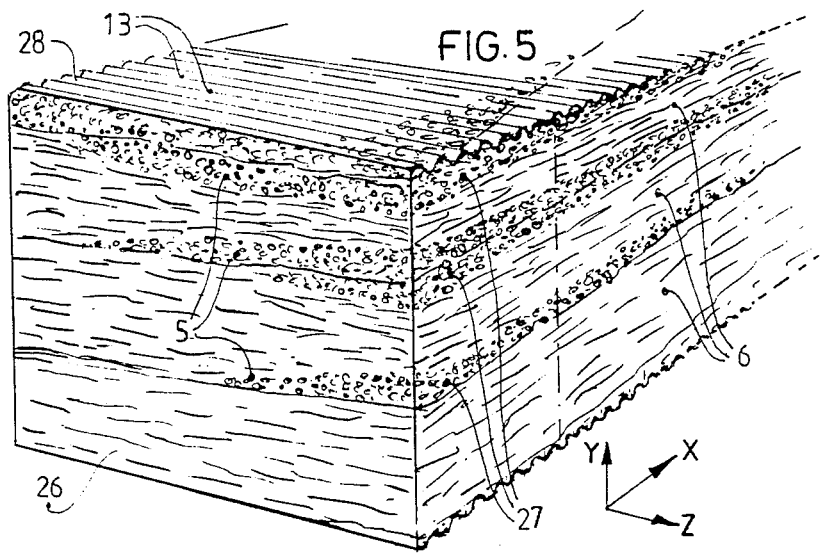
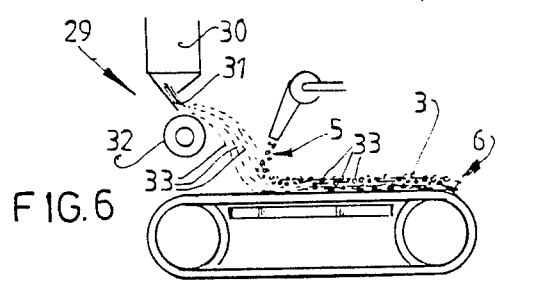
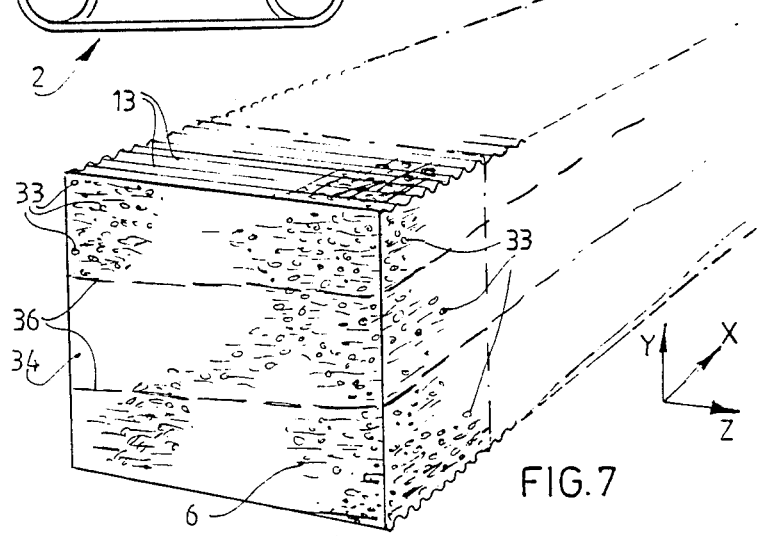

POROUS PRODUCT FOR CULTIVATION PLANTS AND A METHOD FOR MANUFACTURING SAME

This is a continuation of copending application Ser. No. 07/145,480 filed on Jan. 19, 1988 now abandoned.

The current invention relates to a porous product for cultivating plants, comprising a matrix of mineral fibres which can be moistened with water.

Such a porous product is known and is described for instance in the Dutch patent application No. 70.17201. Such a product must possess good capillary dynamics. Understood by this is the ability of the product to distribute the water reserve uniformly throughout the product, or to redistribute it if the water reserve is limited. Good capillary dynamics are of great influence on cultivation yields because as a result of them the maximum rootage volume in the product is determined, possible fluctuations in the electrical conductivity remain restricted and a good water transport is assured in periods during which as a result of the evaporation the plant extracts much water from the product. An increase in water retention capacity therefore contributes to a more operationally effective cultivation process.

The invention has for its object to provide an improved porous product for cultivating plants, the water retaining capacity of which is enlarged. Preferably such that the natural decrease of the moisture content over the height of the product is decreased towards the top. In a known product where the suction tension is −5 cm water the moisture content at the top is 62% by vol. and at the bottom 94% by vol. It is this decrease that the invention seeks to reduce. This is achieved according to the invention in that this product is characterized by material present in the porous product having a greater water retaining capacity than the mineral fibres which form the matrix and which can be moistened with water. This material with a greater water retaining capacity can be incorporated homogeneously or non-homogeneously in the fibre matrix.

In the case of homogeneous distribution it is recommended that the material with a greater water retaining capacity takes the form of flakes.

When distribution is more unhomogeneous, the material with a greater water retaining capacity is applied in the product as at least one layer, or the product preferably possesses at least two layers of the material with a greater water retaining capacity and the volume of water to be held back in the layers decreases in downward direction descending away from the plant. It is thus possible to accommodate the material with a greater water retaining capacity at the top of the product. The advantages associated with this are two-fold, namely that the plant roots present substantially at the bottom of the product take up water at the bottom, so that additional water can be supplied to the roots from the higher layers. Since the roots have the characteristic that they seek out water, the root density at the top of the product will increase as a result of the material with a greater water retaining capacity being present there. In addition a separation is brought about between areas in the product which contain respectively more water/less oxygen and less water/more oxygen. An excess of water impedes the supply of oxygen to the plant roots thereby having a disadvantageous influence on plant growth, which manifests itself for example in a reduced yield.

If in preference the layer or layers of material with a greater water retaining capacity is or are located slantwise in the product, whereby more preferably the layer thickness of a layer also varies, a uniform transition throughout the product between matrix fibres and material with a greater water retaining capacity is nevertheless realized despite the more discrete distribution in this case between both.

The material with a greater water retaining capacity can consist for example of a plastic, more particularly a foam plastic, and suitable inorganic materials. More preferably the material consists of mineral fibres that can be moistened with water which possess, however, a greater density relative to the mineral fibres forming the matrix. The difference in density is at least 20 kg/m$^3$, preferably 30 kg/m$^3$, or more preferably 40 kg/m$^3$. The material with a greater water retaining capacity hereby has a density of 70–150 kg/m$^3$, and more preferably of 100–150 kg/m$^3$.

The water retaining capacity is determined for rock wool by Rockwool Lapinus with an internal test in which the re-moistening of the porous product is determined as a function of the suction tension expressed in centimetres water column. A porous product with a large suction tension is therefore wetter and allows better rootage. When the suction tension is smaller the material is drier. It can be stated as a rule of thumb that a material with a density of 70 kg/m$^3$ at a suction tension of −5 cm of water contains 70% water by volume. An increase or a decrease in density of 10 kg/m$^3$ leads respectively to an increase or decrease of approximately 5% water by volume. This rule of thumb is valid for the same products with a density lying between 20 and 120 kg/m$^3$. A difference in density of 20, 30 or 40 kg/m$^3$ therefore leads to an increase in moisture in the porous product of respectively 10, 15 or 20% by volume.

The invention further relates to a method for manufacturing a porous product for cultivating plants, comprising a matrix of mineral fibres which can be moistened with water, whereby the latter are formed into a primary membrane, and is characterized in that material is added during the forming of the primary membrane, or in that the material is added to the formed primary membrane, the water retaining capacity of which material is greater than the mineral fibres which form the matrix and which can be moistened with water.

If the primary membrane is folded with a sideways reciprocating movement into a secondary membrane that is cured and the material is added over the whole width of the primary membrane, multiple layers of the material with a greater water retaining capacity can be incorporated in the product.

If the material is added over only a portion of the width of the primary membrane, then, depending on the portion of the width onto which the material is added, the material with a greater water retaining capacity is obtained in the final product at choice at the top, at the bottom and, if required, in the centre of the product. If preferably a quantity of material is added which decreases towards the centre of the membrane, the thickness of the layer of material decreases gradually.

If the material with a greater water retaining capacity consists of flakes, then these flakes can be mixed with the flakes which eventually form the matrix fibres. An homogeneous distribution over the product can in that case be obtained, irrespective of whether the product is manufactured via a reciprocating method. As a result of variation over the width it is further possible that the flakes are present only over a portion of the height of the product.

Mentioned and other characteristics will be elucidated with reference to a number of embodiments of the method and the products made thereby.

FIG. 1 is a simplified perspective view of a method for preparing the porous product according to the invention;

FIG. 2 shows on a larger scale a manufactured growing block;

FIG. 4 shows a variant of the section along the line from IV—IV from FIG. 1;

FIG. 5 is a view along the arrow V from FIG. 1, whereby the material is applied as according to FIG. 4;

FIG. 6 is a view along the narrow VI from FIG. 1, of a method variant;

FIG. 7 shows a view corresponding with FIG. 5 of a product manufactured according to the method variant from FIG. 6.

FIG. 1 shows a device 1 for manufacturing the porous product according to the invention.

Figure 8:
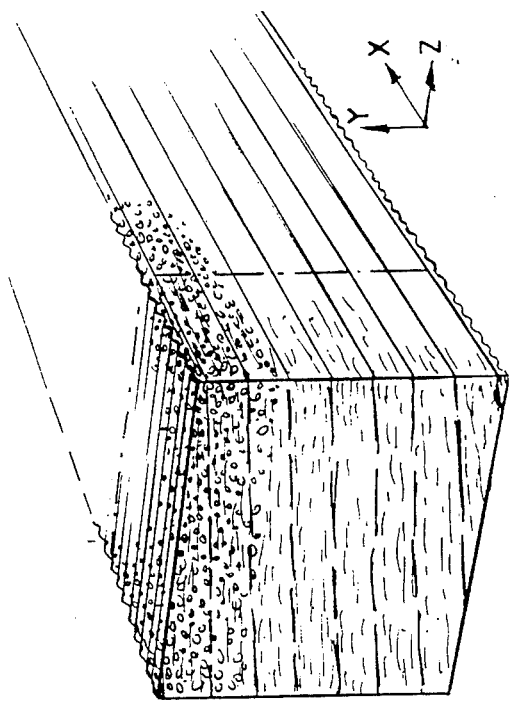
FIG. 8 is a view corresponding with FIG. 7 of a product according to the invention, whereby flakes are added with the method variant as in FIG. 6 over a portion of the width (as in FIG. 4).

Formed in a cupola furnace is a mineral smelt which is then fiberised in an air flow and carried thereby to a conveyor 2. The fibres are coated in the air flow with a binding agent, for instance phenol-formaldehyde resin, and, so that the mineral fibres can be made moist with water, also with a moisturizing agent. On conveyor 2 is formed a fibre blanket, called the primary membrane 3. Then applied from a funnel 4 onto the primary membrane 3 over its whole width is material 5 which has a greater water retaining capacity than a matrix 6 which is formed from the mineral fibres which can be moistened and which form primary membrane 3.

Using known means (sandwich conveyors, not shown), which perform a sideways reciprocating movement relative to a conveyor 7 located downstream, the primary membrane 3 provided with material 5 is laid off in folded state onto conveyor 7. The folding interval a is dependent on conveying speed and the width of both conveyors 2 and 7. The fold interval a determines the number of primary membranes that are present in the porous product in its vertical height.

The folded primary membrane 3 forms a so-called secondary membrane 9, the binding agent of which is cured in a curing oven 10 (temperature approximately 200° C.).

The curing oven 10 comprises an upper conveyor 11 and lower conveyor 12, the distance between each of which can be adjusted so that the secondary membrane 9 can be compressed to the required thickness. The profile 13 of the upper and lower conveyor 11 and 12 is recognizable in the secondary membrane 9 and the products 8 manufactured from it. After leaving the curing oven the secondary membrane 9 is cut to the required product version in a schematically shown cutting device 14. Using the saw member 15, if required combined with a saw member cutting in the X-Z plane, mats 17 are manufactured, and combined use of saw members 15 and 16 produces growing blocks 18.

It is remarked that if only the saw member 15 is used and its cutting pitch corresponds with the height of mat 17 and the height of the secondary membrane 9 corresponds with the width of the mat, the current invention is combined with another invention in the name of applicant, set down in a Dutch patent application submitted concurrently.

Figure 3:
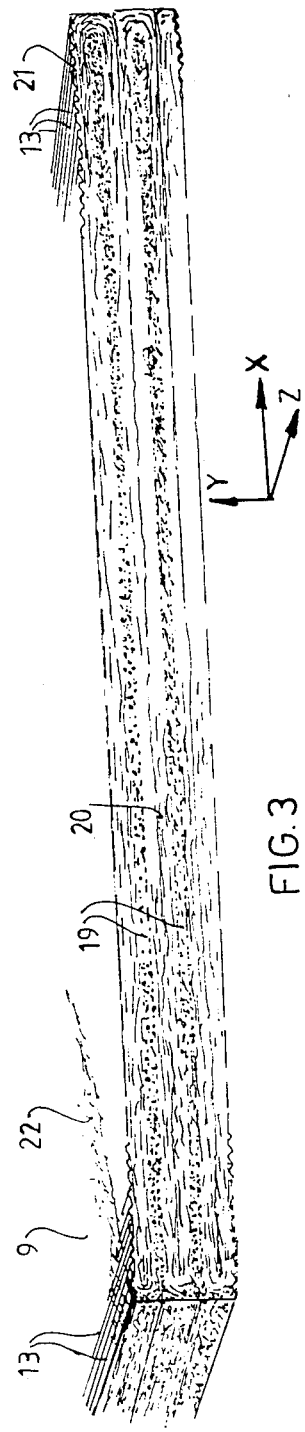
FIG. 3 shows on a larger scale the manufactured porous product from FIG. 1, out of which growing mats can be cut.

FIG. 3 shows in section the cured secondary membrane 9 manufactured in FIG. 1. Visible over the height of the secondary membrane are at least two layers 19 which consist of material with a greater water retaining capacity. Each layer 19 is built up of two sub-layers which are laid onto each other during folding under the influence of the reciprocating movement. Layers 19 are separated by a layer 20 which consists of two sub-layers of primary membrane 3. It is noted that there is no sharp separation between layers 19 and 20, so that the plant roots can pass through the layers 19.

If in accordance with a normal cutting operation the secondary membrane 9 is halved at half height and sawn in the width with the saw member 15 shown in FIG. 1, mats result in which a layer 19 is present.

Visible in at least the upper surface 21 is the oven profile 13, and further visible are wedge-shaped areas of material 5. It will be apparent that the material 5 is sufficiently anchored in the matrix formed by the primary membrane 3.

FIG. 2 shows a growing block 23 that is manufactured by application of cutting members 15 and 16. This growing block 23 comprises two layers 19 enclosed by a layer 20. The oven profile 13 is recognizable in the surface 24. As a result of the folding, layers 19 and 20 are slanted to the X-Y plane.

If it is desired that layers 19 and 20 are located substantially in a horizontal plane, such a growing block must be cut out of the secondary membrane 9 in a different manner.

It will be apparent that by shortening the folding interval a the number of layers 19 will increase in the secondary membrane 9.

FIG. 4 shows a variant whereby the primary membrane 3 that lies on the upper part 25 of conveyor 2 is provided over only a portion of its width with the material 5, whereby also the layer thickness b decreases towards the centre of the primary membrane 3. The left-hand side part of primary membrane 3 is provided with material 5. This means that as a result of the folding operation the material 5 is arranged comparatively more in the upper part of the secondary membrane 9. This is shown in FIG. 5 which shows a part of the finished product 26. The layers 27 of material 5 are now wedge-shaped and slope relative to the upper surface 28 in which can be recognized the oven profile 13. Clearly visible is that from the surface 28 downward the amount of material 5 decreases and with it the water retaining capacity.

As a result of the now wedge-shaped layers 27 of material 5 is achieved a more uniform transition to the matrix 6. If the product 26 is used as growing mat in the position shown in FIG. 5, most of the plant roots are then situated at the bottom of the product 26 and additional water can be supplied downwards to the roots out of the layers 27. The root density at the top of the product 26 will moreover increase due to the water seeking character of the plant roots. All this leads to a greater volume of root spread.

FIG. 6 shows schematically another device 29 according to the invention. A mineral smelt 31 leaving a cupola furnace 30 is made fibrous on a rotary fiberising disc 32. The fibres 33 are then deposited onto the conveyor 2. At variance with the device 1 from FIG. 1, the material 5, in this case mineral fibre flakes 33, is already supplied before the primary membrane 3 is formed on the conveyor 2. In this way a good homogeneous distribution of the flakes 33 in the matrix 6 is obtained. It is noted that prepared flakes 33 can be used, or that flakes 33 manufactured at that moment in another fiberising device are added, in which the binding agent has not yet hardened.

If the flakes 33 are applied over the whole width of the primary membrane 3, this results in the product 34 shown in FIG. 7, where the flakes 33 are distributed substantially homogeneously in the matrix 6. To clarify this concept, dividing lines 36 are put in to indicate the division between successive primary membranes. If the flakes 33 are added as according to FIG. 4 to the primary membrane 3 over a portion of its width, the quantity of flakes 33 in the product will then gradually decrease from the top towards the bottom, while the concentration in the width of the product is substantially constant (FIG. 8).

In this case, at the top of the product there is a 20% by vol. (locally 40% by vol.) of waterabsorbing wool. At a suction tension of −5 cm water the moisture content at the top becomes approximately 73% by vol. (62% by vol. in comparison sample). This means that the moisture concentration over the height of the product has decreased towards the top by 11% by vol. The water retaining capacity has been actually enlarged at the top of the product.

It will be apparent that as a result of the fairly homogeneous distribution of the flakes 33 in the primary membrane 3, forming of the secondary membrane can if desired be dispensed with and the product will thus be formed from a considerably thicker primary membrane.

It will be apparent to a person skilled in the art that the concentration over the height of the product and whether or not the concentration of material 5 over its width is constant can be decided subject to the plants or plant crops for cultivation.

I claim:

1. Porous product for cultivating plants, comprising a matrix of mineral fibres which can be moistened with water, characterized by material present in said porous product having a greater water retaining capacity than said mineral fibres which form said matrix and which can be moistened with water, said material being distributed throughout said matrix within the interstices among said mineral fibres which form said matrix.

2. Product as claimed in claim 1, characterized in that the material with a greater water retaining capacity is distributed throughout said matrix and said matrix is present in said product as at least one layer.

3. Product as claimed in claim 2, characterized in that the product possesses at least two layers of the matrix containing the material with a greater water retaining capacity.

4. Product as claimed in claim 2, characterized in that the matrix layer having material with a greater water retaining capacity distributed therein throughout is located slantwise in the product.

5. Product as claimed in claim 2, characterized in that said matrix, together with said material distributed throughout said matrix, forms at least one layer in said product, said layer having nonuniform thickness.

6. Product as claimed in claim 2, characterized in that the material having a greater water retaining capacity consists of flakes.

7. Product as claimed in claim 1, characterized in that the material consists of mineral fibres that can be moistened with water, the density of which is at least 20 kg/m$^3$ greater than the density of the mineral fibre matrix.

8. Product as claimed in claim 7, characterized in that the density of the material with a greater water retaining capacity amounts to 70–150 kg/m$^3$.

9. Product as claimed in claim 7 characterized in that the material with a greater water retaining capacity takes the form of flakes.

10. Product as claimed in claim 1, characterized in that the material with a greater water retaining capacity comprises a plastic material.

11. Product as claimed in claim 1 characterized in that in said product the principal direction of the mineral fibres extending in the matrix runs in the longest dimension of said product, and that a curing profile is present in at least one upright longitudinal surface of said product.

12. Product as claimed in claim 1, characterized in that the material with a greater water retaining capacity comprises an inorganic material.

* * * * *